United States Patent
Wang et al.

(10) Patent No.: US 11,748,340 B2
(45) Date of Patent: Sep. 5, 2023

(54) DATA PAIR GENERATING METHOD, APPARATUS, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Lijie Wang, Beijing (CN); Ao Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/383,642

(22) Filed: Jul. 23, 2021

(65) Prior Publication Data
US 2022/0179847 A1    Jun. 9, 2022

(30) Foreign Application Priority Data

Dec. 3, 2020    (CN) .......................... 202011410065.5

(51) Int. Cl.
*G06F 16/00* (2019.01)
*G06F 16/242* (2019.01)
(Continued)

(52) U.S. Cl.
CPC .......... *G06F 16/242* (2019.01); *G06F 16/245* (2019.01); *G06F 40/205* (2020.01); *G06F 40/30* (2020.01)

(58) Field of Classification Search
CPC .... G06F 16/242; G06F 16/245; G06F 40/205; G06F 40/30; G06F 16/2452;
(Continued)

(56) References Cited

U.S. PATENT DOCUMENTS

| 5,924,089 | A | 7/1999 | Mocek et al. |
| 2012/0078895 | A1 | 3/2012 | Chu-Carroll et al. |
| 2014/0095469 | A1 | 4/2014 | Chen et al. |
| 2019/0272296 | A1 | 9/2019 | Prakash et al. |
| 2020/0133952 | A1 | 4/2020 | Sheinin et al. |
| 2020/0301925 | A1 | 9/2020 | Zhong et al. |

(Continued)

FOREIGN PATENT DOCUMENTS

| CN | 105103152 A | 11/2015 |
| CN | 106649294 A | 5/2017 |

(Continued)

OTHER PUBLICATIONS

Notice of Reasons for Refusal of Japanese patent application No. 2021-185341 dated Jan. 5, 2023, 3 pages.

(Continued)

*Primary Examiner* — Paul Kim
(74) *Attorney, Agent, or Firm* — Brooks Kushman P.C.

(57) ABSTRACT

The present disclosure provides a data pair generating method, apparatus, electronic device and storage medium, and the field of artificial intelligence such as natural language processing and deep learning. The method may include: generating M SQL query statements for a given database, where M is a positive integer greater than one; performing the following processing for each SQL query statement: dividing the SQL query statement into at least one SQL clause; obtaining a question description corresponding to each SQL clause; combining the question descriptions to obtain a question corresponding to the SQL query statement. The solution of the present disclosure may be applied to save manpower and time costs.

14 Claims, 5 Drawing Sheets

(51) Int. Cl.
*G06F 16/245* (2019.01)
*G06F 40/205* (2020.01)
*G06F 40/30* (2020.01)

(58) Field of Classification Search
CPC .... G06F 16/332; G06F 40/56; G06F 16/2433; G06F 16/24549; G06N 20/00
See application file for complete search history.

(56) References Cited

U.S. PATENT DOCUMENTS

2021/0124738 A1\* 4/2021 Swamy ................. G06N 20/00
2021/0201174 A1\* 7/2021 Huang .................... G06F 40/56

FOREIGN PATENT DOCUMENTS

| CN | 110609849 A | 12/2019 |
| CN | 111382171 A | 7/2020 |
| CN | 111522839 A | 8/2020 |
| JP | 2020524861 A | 8/2020 |
| KR | 20200080822 A | 7/2020 |
| WO | 2018180106 A1 | 10/2018 |

OTHER PUBLICATIONS

Sun, A Synthetic Analysis of Assisted Classroom Practice in Adult English Teaching, Cultural Education, vol. 36, No. 2, 2007, 6 pages.
Cui et al., Database Physical Structure Optimization Technology, Department of Computer Science and Technology, Tsinghua National Laboratory for Information Science and Technology (Tsinghua University), Beijing, China, Journal of Software, 2013, 24(4), 761-780, 21 pages.
Li et al., A Comprehensive Exploration on Spider with Fuzzy Decision Text-to-SQL Model, IEEE Transactions on Industrial Informatics, vol. 16, No. 4, Apr. 2020, 2542-2550.

\* cited by examiner

DATA PAIR GENERATING METHOD, APPARATUS, ELECTRONIC DEVICE AND STORAGE MEDIUM

CROSS-REFERENCE TO RELATED APPLICATIONS

The present application claims the priority of Chinese Patent Application No. 202011410065.5, filed on Dec. 3, 2020, with the title of "Data pair generating method, apparatus, electronic device and storage media." The disclosure of the above application is incorporated herein by reference in its entirety.

TECHNICAL FIELD

The present disclosure relates to the technical field of artificial intelligence, and particularly to a data pair generating method, apparatus, electronic device and storage medium in the fields of natural language processing and deep learning.

BACKGROUND

Text-to-SQL in semantic parsing is a kernel technique in language understanding and aims to automatically convert a natural language question into a Structured Query Language (SQL) query statement which may interact with a database.

Regarding any question, a SQL query statement corresponding to the question may be generated by a semantic parsing model obtained by pre-training. The semantic parsing model is usually obtained in a guided manner based on labeled training data. In practical application, new databases, i.e., databases that are not seen in training data, are often encountered; a conventional semantic parsing model has a certain generalization capability for the new databases, but cannot exhibit a desirable effect. Therefore, it is desirable that there are training data based on the new databases.

At present, the training data are usually built in a manually-labeled manner, i.e., a question-SQL query statement pair. However, this manner requires consumption of a lot of manpower and time costs and exhibits an undesirable efficiency.

SUMMARY

The present disclosure provides a data pair generating method, apparatus, electronic device and storage medium.

A method for generating data pair, including: generating M Structured Query Language SQL query statements for a given database, where M is a positive integer greater than one; performing the following processing for each SQL query statement: dividing the SQL query statement into at least one SQL clause; obtaining a question description corresponding to each SQL clause; combining the question descriptions to obtain a question corresponding to the SQL query statement.

An electronic device, including: at least one processor; and a memory communicatively connected with the at least one processor; wherein the memory stores instructions executable by the at least one processor, and the instructions are executed by the at least one processor to enable the at least one processor to perform a method for generating data pair, wherein the method includes: generating M SQL query statements for a given database, where M is a positive integer greater than one; performing the following processing for each SQL query statement: dividing the SQL query statement into at least one SQL clause; obtaining a question description corresponding to each SQL clause; combining the question descriptions to obtain a question corresponding to the SQL query statement.

A non-transitory computer readable storage medium with computer instructions stored thereon, wherein the computer instructions are used for causing a computer to perform a method for generating data pair, wherein the method includes: generating M Structured Query Language SQL query statements for a given database, where M is a positive integer greater than one; performing the following processing for each SQL query statement: dividing the SQL query statement into at least one SQL clause; obtaining a question description corresponding to each SQL clause; combining the question descriptions to obtain a question corresponding to the SQL query statement.

An embodiment of the present disclosure has the following advantages or advantageous effects: a plurality of SQL query statements may be generated first for a given database, and then a series of processing may be performed for each SQL query statement to generate a corresponding question, thereby achieving automatic generation of the question-SQL query statement pair, and saving the manpower and time costs and improving the processing efficiency as compared with a conventional manner.

It will be appreciated that the Summary part does not intend to indicate essential or important features of embodiments of the present disclosure or to limit the scope of the present disclosure. Other features of the present disclosure will be made apparent by the following description.

BRIEF DESCRIPTION OF THE DRAWINGS

The figures are only intended to facilitate understanding the solutions, not to limit the present disclosure. In the figures.

DETAILED DESCRIPTION

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
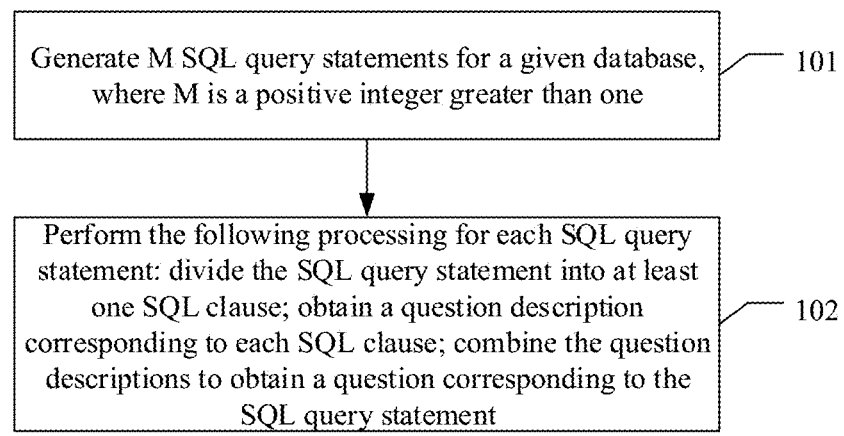
FIG. 1 illustrates a flow chart of a method for generating data pair according to an embodiment of the present disclosure.

FIG. 1 illustrates a flow chart of a method for generating data pair according to an embodiment of the present disclosure. The data pair refers to a question-SQL query statement pair. FIG. 1 shows the following specific implementation.

In step 101, M SQL query statements are generated for a given database, where M is a positive integer greater than one.

In step 102, the following processing is performed for each SQL query statement: divide the SQL query statement into at least one SQL clause; obtain a question description corresponding to each SQL clause; combine the question descriptions to obtain a question corresponding to the SQL query statement.

It can be seen that in the solution described in the above method embodiment, a plurality of SQL query statements may be generated first for a given database, and then a series of processing may be performed for each SQL query statement to generate a corresponding question, thereby achieving automatic generation of the question-SQL query statement pair, and saving the manpower and time costs and improving the processing efficiency as compared with a conventional manner.

Specific implementations of the above contents will be described in detail below, respectively.

1) Generate a SQL query statement.

M SQL query statements may be generated for a given database. Preferably, M SQL query statements may be generated according to production rules summarized based on SQL grammar, and a specific value of M may be determined according to actual needs.

SQL is an executable language based on its own grammar. Some production rules may be summarized based on the SQL grammar, for example, as shown below.

SQLs::=SQL l SQL intersect SQLs l SQL union SQLs l SQL except SQLs

SQL::=Select l Select Where l Select Group l Select Where Group l Select Order l Select Where Order l Select From SQL,SQL Select::=SELECT A l SELECT A A l SELECT A A A l SELECT A A A A Where::=WHERE Conditions

Group::=GROUP BY C l GROUP BY C HAVING Conditions l GROUP BY C Order

Order::=ORDER BY C Dir l ORDER BY C Dir LIMIT value l ORDER BY A Dir LIMIT value Dir::=ASC l DESC Conditions::=Condition l Condition AND Conditions l Condition OR Conditions Condition::=A op value l A op SQL A::=C l min C l max C l avg C l count C l sum C C::=table.column l table.column mathop table.column mathop::=+l−l−*l/ op::===l!=l>l>=l<l<=l like l in l not in l exist l between

The above content in bold font may be used to generate complex grammars, such as nested query, multi-clause query, and so on.

Figure 2:
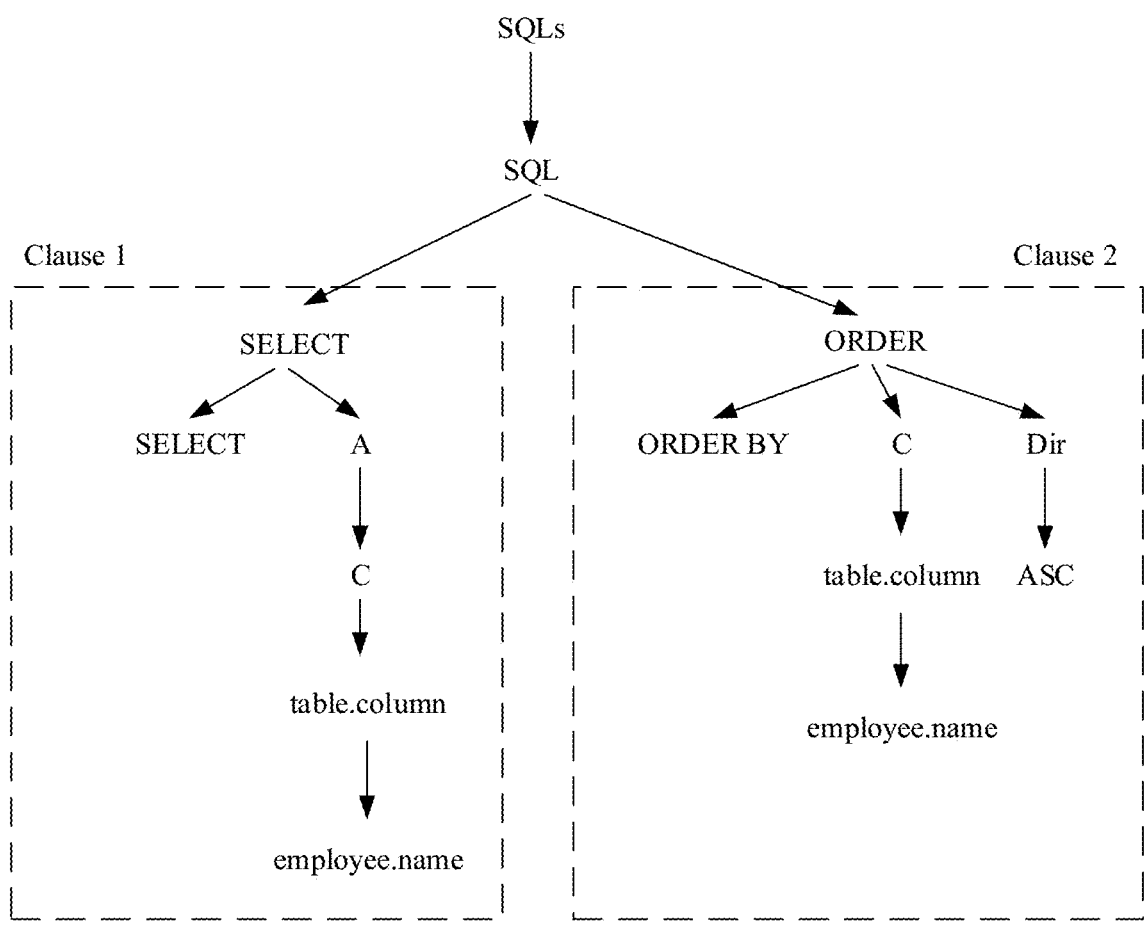
FIG. 2 illustrates a schematic diagram of a tree corresponding to a SQL query statement x according to the present disclosure.

Any SQL query statement may be represented as a tree based on the production rules. For example, the SQL query statement x is "SELECT name FROM employee ORDER BY age ASC", as shown in FIG. 2. FIG. 2 illustrates a schematic diagram of a tree corresponding to a SQL query statement x according to the present disclosure. Schematic. A corresponding production sequence is: {SQLs=SQL, SQL=Select Order, Select=SELECT A, Order=ORDER BY C Dir, A=C, C=table.column, Dir=ASC, C=table.column} etc. The production sequence also shows a generation process of the SQL query statement x.

Various possible SQL query statements may be generated conveniently and accurately based on the production rules, and the generated SQL query statements need to cover various SQL forms as many as possible to improve the subsequent semantic analysis model training effect.

2) Generate a question corresponding to a SQL query statement.

For any SQL query statement, a high-quality question needs to be generated to describe it. The high-quality question need to satisfy the following two points: 1) comply with a structure of SQL query statement, i.e., express a structure such as nesting of the SQL query statement; 2) ensure semantic correctness of the SQL query statement, especially ensure the semantics of database elements contained therein.

It is found from the analysis of the data that a complex SQL query statement may be divided into simple and common SQL clauses. For example, the above SQL query statement x is composed of two common SQL clauses, namely a select clause and an order clause, i.e., clause 1 and clause 2 shown in FIG. 2. Each SQL clause is semantically independent and complete.

Therefore, the present disclosure proposes a mechanism for generating a corresponding question based on SQL structural layers. The following processing may be performed for each SQL query statement: divide the SQL query statement into at least one SQL clause; obtain a question description corresponding to each SQL clause; combine the question descriptions to obtain the problem corresponding to the SQL query statement.

Preferably, for each SQL query statement, the SQL query statement may be first divided into at least one SQL clause according to the structure of the SQL query statement, wherein each SQL clause is semantically independent and complete.

For example, the SQL structure may include: WHERE A1 op SELECT A2, which is from the nested query {WHERE A1 op SQL}, where op is from the set of {>,≥,<,≤,=,≠} and A2 is the component in the select clause of SQL; WHERE table1 op table2, which means an operation from the set of {and,or,not} is performed on table1 and table2, it is from the nested query {WHERE A op SQL} with the op from {in,not in}, or multi-SQL queries, such as {SQL intersect SQLs}.

The SQL clauses obtained by dividing with reference to the above production rules may include the following forms: SELECT A FROM table, SELECT A GROUP BY C, GROUP BY C HAVING Conditions, GROUP BY C ORDER BY A Dir, GROUP BY C ORDER BY A Dir LIMIT value, ORDER BY C Dir, ORDER BY C Dir LIMIT value, WHERE C op value, etc.

A corresponding question description may be obtained for each SQL clause obtained from the division. Preferably, for any SQL clause, a pre-trained generation model may be used to generate the question description corresponding to the SQL clause.

Furthermore, the question descriptions corresponding to the SQL clauses may be combined to obtain a final desired problem, namely, the problem corresponding to the SQL query statement. Preferably, the question descriptions corresponding to the SQL clauses may be combined in an execution order of the SQL clauses, namely, the structure of the SQL query statement.

Through the above processing, the obtained question may be enabled to express the same semantics as the corresponding SQL query statement, and conform to the structure of the SQL query statement, etc., i.e., may ensure the generation of the high-quality question.

Figure 3:
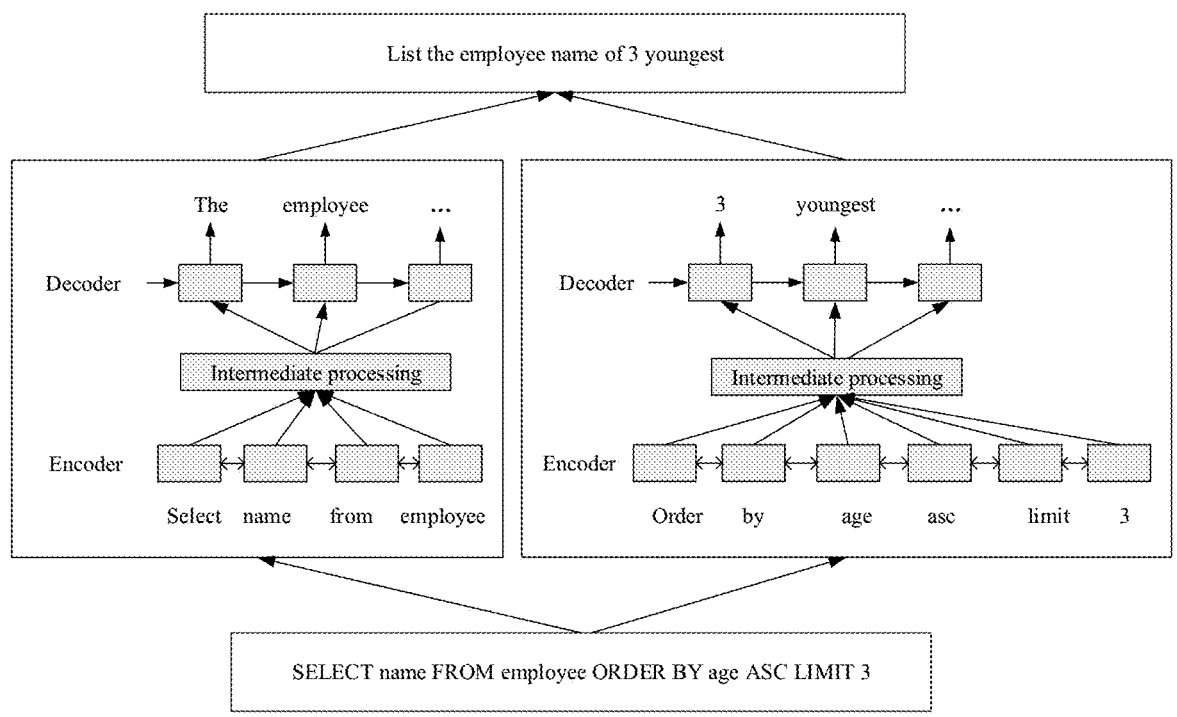
FIG. 3 illustrates a schematic diagram of a process of generating a question corresponding to a SQL query statement y according to the present disclosure.

Take the SQL query statement y "SELECT name FROM employee ORDER BY age ASC LIMIT 3" as an example. FIG. 3 illustrates a schematic diagram of a process of generating a question corresponding to a SQL query statement y according to the present disclosure.

As shown in FIG. 3, first, the SQL query statement y may be divided according to the structure of the SQL query statement y into two SQL clauses, namely, "Select name from employee" and "Order by age asc limit 3"; for each SQL clause, the corresponding question description shown in FIG. 3 may be generated using a generation model, and then the questions corresponding to the two SQL clauses may be combined according to the execution order of the two SQL clauses, thereby obtaining the problem "List the employee name of 3 youngest" corresponding to the SQL query statement y.

As shown in FIG. 3, the generation model may be a sequence-to-sequence (Seq2Seq) generation model based on an Encoder-Decoder structure. Preferably, the generation model may be a generation model with a copying mechanism, i.e., the generation model incorporates a Copying Mechanism in Sequence-to-Sequence Learning), the input is a SQL clause, and the output is a corresponding question description.

The above generation model may be obtained by pre-training. Preferably, the generation model may be obtained by constructing an SQL clause-question description pair according to an existing question-SQL query statement pair, and training according to the constructed SQL clause-question description pair.

The following processing may be performed for any question-SQL query statement pair: divide the SQL query statement in the question-SQL query statement pair into at least one SQL clause; obtain the question description corresponding to each SQL clause; the question description corresponding to any SQL clause includes: problem fragments of the question in the question-SQL query statement pair covering all units in the SQL clause; correspondingly, each SQL clause and the corresponding question description may respectively be regarded as one constructed SQL clause-question description pair.

Figures 4, 5:
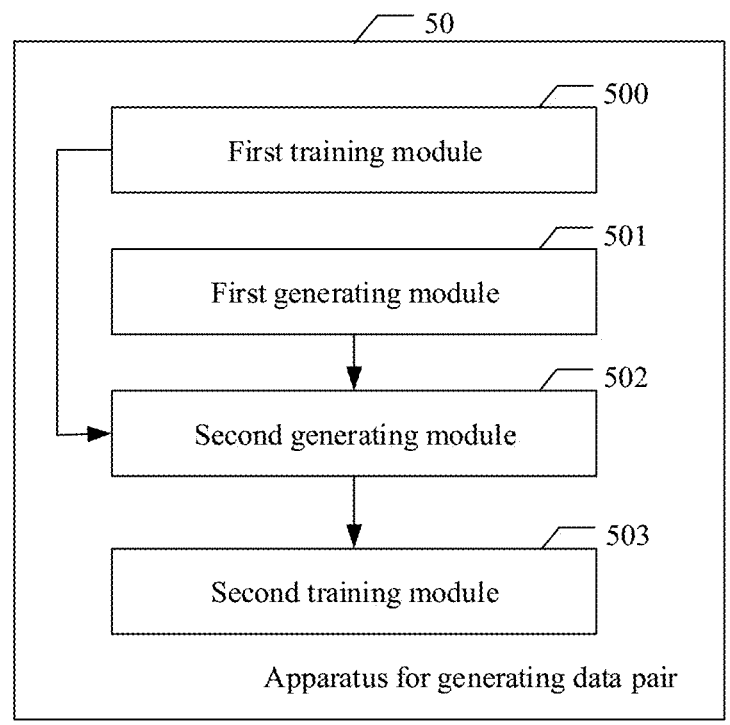
FIG. 4 illustrates a schematic diagram of an alignment manner according to the present disclosure.
FIG. 5 illustrates a schematic diagram of an embodiment of an apparatus 50 for generating data pair according to the present disclosure.

For example, a question in a certain question-SQL query statement pair is "Show the stadium name and capacity with most number of concerts in year 2014 or after", the corresponding SQL query statement is "SELECT T2.name, T2.capacity FROM concert AS T1 JOIN stadium AS T2 ON T1.stadium_id=T2.stadium_id WHERE T1.year>=2014 GROUP BY T1.stadium_id ORDER BY count(*) DESC LIMIT 1", and the question may be aligned with units in the SQL query statement. The units may be defined as table name, column name, value, aggregation operation, etc. The alignment may be performed in a character string matching manner, as shown in FIG. 4. FIG. 4 illustrates a schematic diagram of an alignment manner according to the present disclosure.

The SQL query statement "SELECT T2.name, T2.capacity FROM concert AS T1 JOIN stadium AS T2 ON T1.stadium_id=T2.stadium_id WHERE T1.year>=2014 GROUP BY T1.stadium_id ORDER BY count(*) DESC LIMIT 1" may be divided into three SQL clauses, namely, "SELECT name, capacity FROM stadium", "WHERE concert year>=2014)" and "GROUP BY stadium id ORDER BY count concert DESC LIMIT 1". The question descriptions corresponding to these three SQL clauses may be obtained respectively, wherein the question description corresponding to the SQL clause "SELECT name, capacity FROM stadium" may be "show the stadium name and capacity with", the question description corresponding to the SQL clause "WHERE concert year>=2014" may be "of concerts in year 2014 or after", and the question description corresponding to the SQL clause "GROUP BY stadium id ORDER BY count concert DESC LIMIT 1" may be "with most number of concerts in". As such, the following three SQL clause-question description pairs may be respectively obtained: "SELECT name, capacity FROM stadium"-- "show the stadium name and capacity with", "WHERE concert year>=2014"-"of concerts in year 2014 or after" and "GROUP BY stadium id ORDER BY count concert DESC LIMIT 1"-"with most number of concerts in".

As stated above, the question description corresponding to any of the above SQL clauses may be a problem fragment of the question in the question-SQL query statement pair covering all units in the SQL clause; the question fragment may refer to the shortest question segment covering all the units in the SQL clause; it is also possible to, on the basis of the shortest question segment, further expand to the left and right to obtain some words failing to match any units and put the words to the segment to make the semantics of the obtained question segment more complete.

It may be seen that the question descriptions and SQL clauses obtained in the manner described in this application are not necessarily strictly aligned, but analysis shows that such data is relatively sparse and has little effect on the final result.

For different question-SQL query statement pairs, a plurality of SQL clause-question description pairs may be generated in the above-mentioned manner respectively for training the generation model.

In practical application, the following situations might occur: the same SQL clause corresponds to different question descriptions. For example, the SQL clause "ORDER BY age ASC" corresponds to question descriptions such as "in ascending order of age", "sort them by age in ascending order" and "from youngest to oldest". The question descriptions may be sorted in descending order of the frequency of occurrence, and top P question descriptions after the sorting may be selected. P is a positive integer, and its specific value may be determined according to actual needs. For example, top three question descriptions after the sorting may be selected, presumably "in ascending order of age", "sort them by age in ascending order" and "from youngest to oldest", and respectively form SQL clause-question description pairs with the corresponding SQL clause "ORDER BY age ASC" for training the generation model.

In the above manner, the SQL clause-question description pairs may be constructed quickly and accurately and used for training to obtain the generation model, and it is ensured that the generation model obtained by training has a very good accuracy.

Furthermore, after a plurality of question-SQL query statement pairs are automatically generated in the manner stated in the present disclosure, the generated question-SQL query statement pairs may be used as training data to train a semantic analysis model.

Preferably, the generated question-SQL query statement pairs may be added to a training data set in a data enhancement manner to train the semantic parsing model. The training data set includes manually-labeled training data.

The quality of automatically-generated training data is usually not as high as that of manually-labeled training data, and the distribution of the automatically-generated training data might not be very consistent with the distribution in actual application. Therefore, to maximize the function of automatically-generated training data, the generated question-SQL query statement pairs may be added to the training data set in the data enhancement manner to train the semantic parsing model.

Preferably, a dynamic sampling method may be employed to, in each round of training, randomly sample, from the generated question-SQL query statement pairs, question-SQL query statement pairs of the same scale as the manually-labeled training data, and use two types of training data to train the semantic parsing model, thereby maximizing the function of the automatically-generated training data and improving the training effect of the model.

As appreciated, for ease of description, the aforesaid method embodiments are all described as a combination of a series of actions for purpose of brief depictions, but those skilled in the art should appreciated that the present disclosure is not limited to the described order of actions because some steps may be performed in other orders or simultaneously according to the present disclosure. Secondly, those skilled in the art should also appreciate the embodiments described in the description all belong to preferred embodiments, and the involved actions and modules are not necessarily requisite for the present disclosure.

The method embodiment is introduced above. The solution of the present disclosure will be further described hereunder through an apparatus embodiment.

FIG. 5 illustrates a schematic diagram of an embodiment of an apparatus 50 for generating data pair according to the present disclosure. As shown in FIG. 5, the apparatus comprises: a first generating module 501 and a second generating module 502.

The first obtaining module 501 is configured to generate M SQL query statements for a given database, where M is a positive integer greater than one.

The second obtaining module 502 is configured to perform the following processing for each SQL query statement: divide the SQL query statement into at least one SQL clause; obtain a question description corresponding to each SQL clause; combine the question descriptions to obtain a question corresponding to the SQL query statement.

The first generating module 501 may generate M SQL query statements for a given database. Preferably, the first generating module 501 may generate M SQL query statements according to production rules summarized based on SQL grammar. A specific value of M may be determined according to actual needs.

The second generating module 502 may respectively generate questions corresponding to the SQL query statements, thereby obtaining desired question-SQL query statement. As for any SQL query statement, the second generating module 502 may divide the SQL query statement into at least one SQL clause; obtain a question description corresponding to each SQL clause; combine the question descriptions to obtain the problem corresponding to the SQL query statement.

Specifically, for each SQL query statement, the second generating module 502 divides the SQL query statement into at least one SQL clause according to a structure of the SQL query statement, wherein each SQL clause is semantically independent and complete.

The second generating module 502 may obtain a corresponding question description for each SQL clause obtained from the division. Preferably, the second generating module 502 may, for any SQL clause, generate the question description corresponding to the SQL clause by using a pre-trained generation model.

Furthermore, the second generating module 502 may further combine the question descriptions corresponding to the SQL clauses to obtain a final desired problem, namely, a problem corresponding to the SQL query statement. Preferably, the second generating module 502 may combine the question descriptions corresponding to the SQL clauses in an execution order of the SQL clauses, namely, the structure of the SQL query statement.

The above generation model may be obtained by pre-training. Preferably, as shown in FIG. 5, the apparatus may further comprise: a first training module 500 configured to construct an SQL clause-question description pair according to an existing question-SQL query statement pair, and train according to the SQL clause-question description pair to obtain the generation model.

The first training module 500 may perform the following processing for any question-SQL query statement pair: divide the SQL query statement in the question-SQL query statement pair into at least one SQL clause; obtain the question description corresponding to each SQL clause; wherein the question description corresponding to any SQL clause includes: problem fragments of the question in the question-SQL query statement pair covering all units in the SQL clause; correspondingly, each SQL clause and the corresponding question description may respectively be regarded as one constructed SQL clause-question description pair.

As shown in FIG. 5, the apparatus may further comprise: a second training module 503 configured to add the generated question-SQL query statement pairs to a training data set in a data enhancement manner to train a semantic parsing model. The training data set includes manually-labeled training data.

The quality of automatically-generated training data is usually not as high as that of manually-labeled training data, and the distribution of the automatically-generated training data might not be very consistent with the distribution in actual application. Therefore, to maximize the function of automatically-generated training data, the generated question-SQL query statement pairs may be added to the training data set in the data enhancement manner to train the semantic parsing model.

Preferably, the second training module 503 may employ a dynamic sampling method to, in each round of training, randomly sample, from the generated question-SQL query statement pairs, question-SQL query statement pairs of the same scale as the manually-labeled training data, and use two types of training data to train the semantic parsing model.

Reference may be made to corresponding depictions in the aforesaid method embodiment for a specific workflow of the apparatus embodiment shown in FIG. 5. The workflow is not detailed any more.

To sum up, with the solution of the apparatus embodiment of the present disclosure being employed, a plurality of SQL query statements may be generated first for a given database, and then a series of processing may be performed for each SQL query statement to generate a corresponding question, thereby achieving automatic generation of the question-SQL query statement pair, and saving the manpower and time costs and improving the processing efficiency as compared with a conventional manner.

The solution of the present disclosure may be applied to field of artificial intelligence, and particularly to the fields of natural language processing and deep learning.

Artificial intelligence is a branch of science concerned with using a computer to simulate a human being's some thinking processes and intelligent behaviors (e.g., learning, reasoning, thinking, planning etc.) and integrates techniques at the hardware level and techniques at the software level. Artificial intelligence hardware techniques generally include sensors, dedicated artificial intelligence chips, cloud computing, distributed storage, big data processing etc. Artificial intelligence software techniques mainly include major aspects such as compute vision technique, speech recognition technique, natural language processing technique, machine learning/deep learning, big data processing technique, and knowledge graph technique.

According to embodiments of the present disclosure, the present disclosure further provides an electronic device and a readable storage medium.

Figure 6:
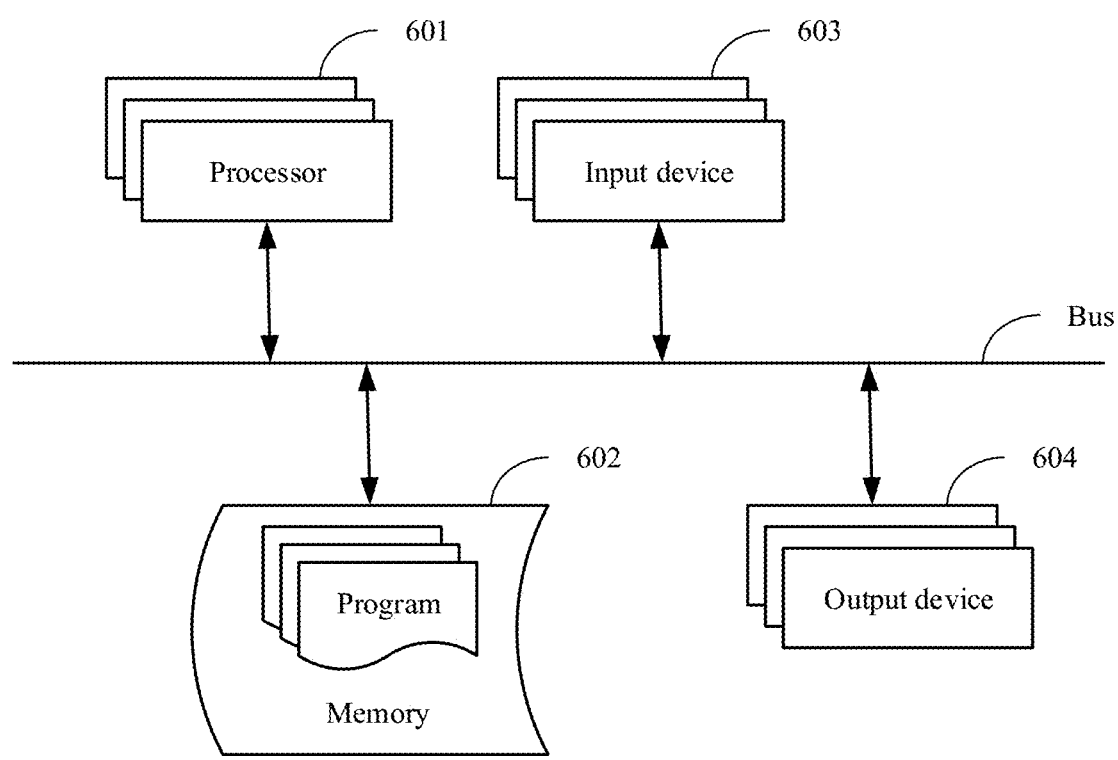
FIG. 6 illustrates a block diagram of an electronic device for implementing the method according to embodiments of the present disclosure.

FIG. 6 illustrates a block diagram of an electronic device for implementing the method according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 6, the electronic device comprises: one or more processors 601, a memory 602, and interfaces configured to connect components and including a high-speed interface and a low speed interface. Each of the components are interconnected using various buses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 601 is taken as an example in FIG. 6.

The memory 602 is a non-transitory computer-readable storage medium provided by the present disclosure. The memory stores instructions executable by at least one processor, so that the at least one processor executes the method according to the present disclosure. The non-transitory computer-readable storage medium of the present disclosure stores computer instructions, which are used to cause a computer to execute the method according to the present disclosure.

The memory 602 is a non-transitory computer-readable storage medium and can be used to store non-transitory software programs, non-transitory computer executable programs and modules, such as program instructions/modules corresponding to the method in embodiments of the present disclosure. The processor 601 executes various functional applications and data processing of the server, i.e., implements the method in the above method embodiments, by running the non-transitory software programs, instructions and modules stored in the memory 602.

The memory 602 may include a storage program region and a storage data region, wherein the storage program region may store an operating system and an application program needed by at least one function; the storage data region may store data created according to the use of the electronic device. In addition, the memory 602 may include a high-speed random access memory, and may also include a non-transitory memory, such as at least one magnetic disk storage device, a flash memory device, or other non-transitory solid-state storage device. In some embodiments, the memory 602 may optionally include a memory remotely arranged relative to the processor 601, and these remote memories may be connected to the electronic device through a network. Examples of the above network include, but are not limited to, the Internet, an intranet, a blockchain network, a local area network, a mobile communication network, and combinations thereof.

The electronic device may further include an input device 603 and an output device 604. The processor 601, the memory 602, the input device 603 and the output device 604 may be connected through a bus or in other manners. In FIG. 6, the connection through the bus is taken as an example.

The input device 603 may receive inputted numeric or character information and generate key signal inputs related to user settings and function control of the electronic device, and may be an input device such as a touch screen, keypad, mouse, trackpad, touchpad, pointing stick, one or more mouse buttons, trackball and joystick. The output device 604 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network, a wide area network, a block chain network, and the Internet.

The computing system may include clients and servers. A client and server are generally remote from each other and typically interact through a communication network. The relationship of client and server arises by virtue of computer programs running on the respective computers and having a client-server relationship to each other. The server may be a cloud server, also referred to as a cloud computing server or a cloud host, and is a host product in a cloud computing service system to address defects such as great difficulty in management and weak service extensibility in a traditional physical host and VPS (Virtual Private Server) service.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for generating data pair, comprising:
generating M Structured Query Language SQL query statements for a given database, where M is a positive integer greater than one;
performing the following processing for each SQL query statement: dividing the SQL query statement into at least one SQL clause; obtaining a question description corresponding to each SQL clause; combining the question descriptions to obtain a question corresponding to the SQL query statement,
wherein the obtaining a question description corresponding to each SQL clause comprises:
for any SQL clause, generating the question description corresponding to the SQL clause by using a pre-trained generation model,
wherein training to obtain the generation model comprises:
constructing an SQL clause-question description pair according to an existing question-SQL query statement pair, and training according to the SQL clause-question description pair to obtain the generation model,
wherein the constructing an SQL clause-question description pair according to an existing question-SQL query statement pair comprises:
performing the following processing for any question-SQL query statement pair:
dividing the SQL query statement in the question-SQL query statement pair into at least one SQL clause;
obtaining the question description corresponding to each SQL clause; wherein the question description corresponding to any SQL clause includes: problem fragments of the question in the question-SQL query statement pair covering all units in the SQL clause.

2. The method according to claim 1, wherein the generating M Structured Query Language SQL query statements comprises: generating M SQL query statements according to production rules summarized based on SQL grammar.

3. The method according to claim 1, wherein the dividing the SQL query statement into at least one SQL clause comprises:
dividing the SQL query statement into at least one SQL clause according to a structure of the SQL query statement, wherein each SQL clause is semantically independent and complete.

4. The method according to claim 1, wherein the combining the question descriptions comprises:
combining the question descriptions corresponding to the SQL clauses in an execution order of the SQL clauses.

5. The method according to claim 1, further comprising:
adding the generated question-SQL query statement pairs to a training data set in a data enhancement manner to train a semantic parsing model, the training data set including manually-labeled training data.

6. The method according to claim 5, wherein the adding the generated question-SQL query statement pairs to a training data set in a data enhancement manner to train a semantic parsing model comprises:
in each round of training, randomly sampling, from the generated question-SQL query statement pairs, question-SQL query statement pairs of the same scale as the manually-labeled training data, and using two types of training data to train the semantic parsing model.

7. An electronic device, comprising:
at least one processor; and
a memory communicatively connected with the at least one processor;
wherein the memory stores instructions executable by the at least one processor, and the instructions are executed by the at least one processor to enable the at least one processor to perform a method for generating data pair, wherein the method comprises:
generating M SQL query statements for a given database, where M is a positive integer greater than one;
performing the following processing for each SQL query statement: dividing the SQL query statement into at least one SQL clause; obtaining a question description corresponding to each SQL clause; combining the question descriptions to obtain a question corresponding to the SQL query statement, wherein the obtaining a question description corresponding to each SQL clause comprises:

for any SQL clause, generating the question description corresponding to the SQL clause by using a pre-trained generation model, wherein training to obtain the generation model comprises:

constructing an SQL clause-question description pair according to an existing question-SQL query statement pair, and training according to the SQL clause-question description pair to obtain the generation model, wherein the constructing an SQL clause-question description pair according to an existing question-SQL query statement pair comprises:

performing the following processing for any question-SQL query statement pair:

dividing the SQL query statement in the question-SQL query statement pair into at least one SQL clause;

obtaining the question description corresponding to each SQL clause; wherein the question description corresponding to any SQL clause includes: problem fragments of the question in the question-SQL query statement pair covering all units in the SQL clause.

8. The electronic device according to claim 7, wherein the generating M Structured Query Language SQL query statements comprises: generating M SQL query statements according to production rules summarized based on SQL grammar.

9. The electronic device according to claim 7, wherein the dividing the SQL query statement into at least one SQL clause comprises:

dividing the SQL query statement into at least one SQL clause according to a structure of the SQL query statement, wherein each SQL clause is semantically independent and complete.

10. The electronic device according to claim 7, wherein the combining the question descriptions comprises:

combining the question descriptions corresponding to the SQL clauses in an execution order of the SQL clauses.

11. The electronic device according to claim 7, further comprising:

adding the generated question-SQL query statement pairs to a training data set in a data enhancement manner to train a semantic parsing model, the training data set including manually-labeled training data.

12. The electronic device according to claim 11, wherein the adding the generated question-SQL query statement pairs to a training data set in a data enhancement manner to train a semantic parsing model comprises:

in each round of training, randomly sampling, from the generated question-SQL query statement pairs, question-SQL query statement pairs of the same scale as the manually-labeled training data, and using two types of training data to train the semantic parsing model.

13. A non-transitory computer readable storage medium with computer instructions stored thereon, wherein the computer instructions are used for causing a computer to perform a method for generating data pair, wherein the method comprises:

generating M Structured Query Language SQL query statements for a given database, where M is a positive integer greater than one;

performing the following processing for each SQL query statement: dividing the SQL query statement into at least one SQL clause; obtaining a question description corresponding to each SQL clause; combining the question descriptions to obtain a question corresponding to the SQL query statement, wherein the obtaining a question description corresponding to each SQL clause comprises:

for any SQL clause, generating the question description corresponding to the SQL clause by using a pre-trained generation model, wherein training to obtain the generation model comprises:

constructing an SQL clause-question description pair according to an existing question-SQL query statement pair, and training according to the SQL clause-question description pair to obtain the generation model, wherein the constructing an SQL clause-question description pair according to an existing question-SQL query statement pair comprises:

performing the following processing for any question-SQL query statement pair:

dividing the SQL query statement in the question-SQL query statement pair into at least one SQL clause;

obtaining the question description corresponding to each SQL clause; wherein the question description corresponding to any SQL clause includes: problem fragments of the question in the question-SQL query statement pair covering all units in the SQL clause.

14. The non-transitory computer readable storage medium according to claim 13, wherein the generating M Structured Query Language SQL query statements comprises: generating M SQL query statements according to production rules summarized based on SQL grammar.

* * * * *